United States Patent
Atmur et al.

(10) Patent No.: US 8,052,092 B2
(45) Date of Patent: Nov. 8, 2011

(54) METHOD AND APPARATUS FOR SATELLITE ORBITAL CHANGE USING SPACE DEBRIS

(75) Inventors: Robert J. Atmur, Whittier, CA (US); Leonard A. Penzo, II, Chino Hills, CA (US)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 12/362,902

(22) Filed: Jan. 30, 2009

(65) Prior Publication Data

US 2010/0193640 A1  Aug. 5, 2010

(51) Int. Cl.
*B64G 1/10* (2006.01)
*B64G 1/64* (2006.01)

(52) U.S. Cl. ............ 244/158.2; 244/158.6; 244/172.5; 244/172.6

(58) Field of Classification Search .......... 244/158.1, 244/158.4, 158.6, 159.4, 164, 167, 172.4–172.6
See application file for complete search history.

(56) References Cited

U.S. PATENT DOCUMENTS

| | | | | |
|---|---|---|---|---|
| 3,254,640 A * | 6/1966 | Sprouse | ............... | 124/16 |
| 3,532,298 A * | 10/1970 | Swet | ............... | 244/167 |
| 3,756,545 A * | 9/1973 | Coutin | ............... | 244/137.4 |
| 3,760,730 A * | 9/1973 | Osborne et al. | ............... | 102/377 |
| 4,015,507 A * | 4/1977 | Toy et al. | ............... | 89/1.57 |
| 4,083,520 A * | 4/1978 | Rupp et al. | ............... | 244/167 |
| 4,257,639 A * | 3/1981 | Stock | ............... | 294/82.26 |
| 4,260,187 A * | 4/1981 | Frosch et al. | ............... | 294/86.4 |
| 4,552,327 A * | 11/1985 | Carter | ............... | 244/137.4 |
| 4,582,277 A * | 4/1986 | von Tiesenhausen | ...... | 244/172.5 |
| 4,632,339 A * | 12/1986 | Yuan | ............... | 244/173.3 |
| 4,750,692 A * | 6/1988 | Howard | ............... | 244/172.4 |
| 4,860,974 A * | 8/1989 | Barnett et al. | ............... | 244/173.3 |
| 5,040,748 A * | 8/1991 | Torre et al. | ............... | 244/173.3 |
| 5,082,211 A * | 1/1992 | Werka | ............... | 244/158.2 |
| 5,163,641 A * | 11/1992 | Yasaka | ............... | 244/164 |
| 5,395,149 A * | 3/1995 | Herman et al. | ............... | 294/82.26 |
| 5,686,687 A * | 11/1997 | Viala et al. | ............... | 89/1.54 |
| 5,725,183 A * | 3/1998 | Geyer et al. | ............... | 244/173.3 |
| 5,755,407 A * | 5/1998 | Aubret et al. | ............... | 244/173.3 |
| 5,860,624 A * | 1/1999 | Obry et al. | ............... | 244/39 |
| 6,119,982 A * | 9/2000 | Jakubowski et al. | ...... | 244/137.4 |
| 6,138,951 A * | 10/2000 | Budris et al. | ............... | 244/173.3 |
| 6,547,476 B2 * | 4/2003 | Kaszubowski et al. | .... | 403/322.3 |
| 7,168,660 B2 * | 1/2007 | Bischof et al. | ............... | 244/158.2 |
| 7,207,525 B2 * | 4/2007 | Bischof et al. | ............... | 244/172.6 |
| 7,503,526 B1 * | 3/2009 | Taylor et al. | ............... | 244/158.2 |
| 7,559,508 B1 * | 7/2009 | Taylor et al. | ............... | 244/172.2 |
| 2004/0159739 A1 * | 8/2004 | Jakubowski, Jr. | ............... | 244/10 |
| 2005/0103940 A1 * | 5/2005 | Bischof et al. | ............... | 244/161 |
| 2005/0269887 A1 * | 12/2005 | Blanding et al. | ............... | 310/112 |

* cited by examiner

*Primary Examiner* — Benjamin P. Lee
*Assistant Examiner* — Joshua Freeman
(74) *Attorney, Agent, or Firm* — Felix L. Fischer

(57) ABSTRACT

An apparatus for orbital change of a satellite incorporates a capture mechanism for space debris and a tether connecting the capture mechanism to a satellite. The tether is extendable to position the capture mechanism relative to the space debris. A controller is employed for timed release of the space debris by the capture mechanism for orbital change by the satellite.

8 Claims, 5 Drawing Sheets

METHOD AND APPARATUS FOR SATELLITE ORBITAL CHANGE USING SPACE DEBRIS

BACKGROUND INFORMATION

1. Field

Embodiments of the disclosure relate generally to the field of spacecraft orbital maneuvering and more specifically to a method and apparatus for creating orbital plane change of a spacecraft by momentum transfer obtained through capture and release of space debris.

2. Background

Modern spacecraft often require the ability to change orbits to fulfill their mission requirements. Engine and propellant requirements to accomplish these plane changes add weight to the spacecraft increasing complexity and cost of the required launch capabilities as well as the spacecraft itself. Additionally the amount of propellant which can be carried is finite which creates life limitations on the spacecraft if significant maneuvering is required.

It is therefore desirable to provide alternatives for providing orbital changes in spacecraft without the use of expendable propellant.

SUMMARY

Exemplary embodiments provide an apparatus for orbital change of a satellite which incorporates a capture mechanism for space debris and a tether connecting the capture mechanism to a satellite. The tether is extendable to position the capture mechanism relative to the space debris. A controller is employed for timed release of the space debris by the capture mechanism.

In one exemplary embodiment, a ram is employed for imparting momentum to the space debris. The capture mechanism in one embodiment is a grappling mechanism having a plurality of arms for grasping the space debris. In an alternative embodiment, the capture mechanism is electrically charged receptacles for capturing ionized space debris attached to the tether in spaced relation to capture oppositely charged debris.

A method for orbital change of a satellite is accomplished by the embodiments through capturing space debris and imparting reaction momentum to the satellite from the space debris to effect an orbital change. In one aspect of the method, capturing space debris includes extending a tether into the orbit of the space debris. Imparting reaction momentum is accomplished by retaining the space debris to impart rotational momentum to the satellite based on differential momentum between the debris and satellite and then releasing the debris.

In an alternative aspect, capturing space debris includes extending a tether into the orbit of the space debris and retracting the tether upon capture of the debris. Imparting reaction momentum is accomplished by retracting a ram to eject the debris, orientating the satellite and ejecting the debris to impart an orbital velocity change.

In each exemplary method releasing the debris may also include placing the debris in an orbit for reentry.

BRIEF DESCRIPTION OF THE DRAWINGS

The features and advantages of embodiments disclosed herein will be better understood by reference to the following detailed description when considered in connection with the accompanying drawings wherein.

DETAILED DESCRIPTION

The embodiments disclosed herein use available reaction mass from space debris orbiting the earth to provide the momentum required to make satellite orbital plane changes. The large amount of space debris in earth orbit ensures that satellites capable of executing such maneuvers would be able to make a significant number of additional satellite orbital plane changes not normally expected from a satellite that used propellant alone, thereby extending its lifetime.

Figure 1:
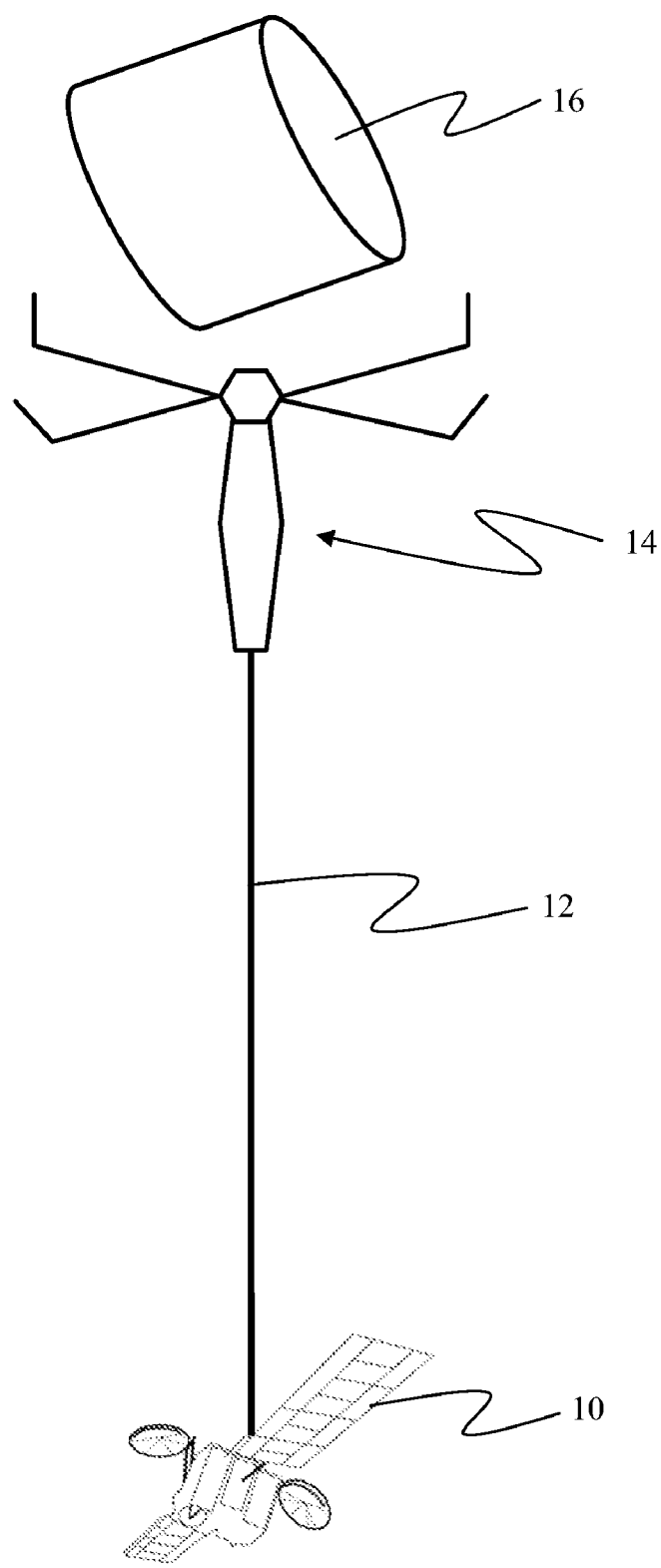
FIG. 1 is an exemplary embodiment of a satellite employing a tethered capture for space debris.

Referring to the drawings, FIG. 1 shows a satellite 10 which incorporates a reeled tether 12 terminating in a capture mechanism 14. The grappling mechanism is configured to capture pieces of orbiting space debris represented by debris 16. The length of the tether is adjustable for positioning the capture mechanism to capture the space debris. Total length of the tether is predetermined to accomplish the maximum momentum transfer. The potential displacement created by available momentum which may be employed for orbital maneuvering by the spacecraft is determined by equation 1.

$$\text{Displacement} = \left( \frac{m_{collected\ debris}}{m_{collected\ debris} + m_{satellite}} \right) L_{tether} \qquad \text{Eq. 1}$$

Maximum reasonable length for the tether is therefore desirable. In exemplary embodiments a tether length of approximately 50 kilometers is employed. Exemplary space debris for which capture is anticipated may range in mass from approximately 1 kilograms to 1000 kilograms.

Figures 2A, 2B, 2C:
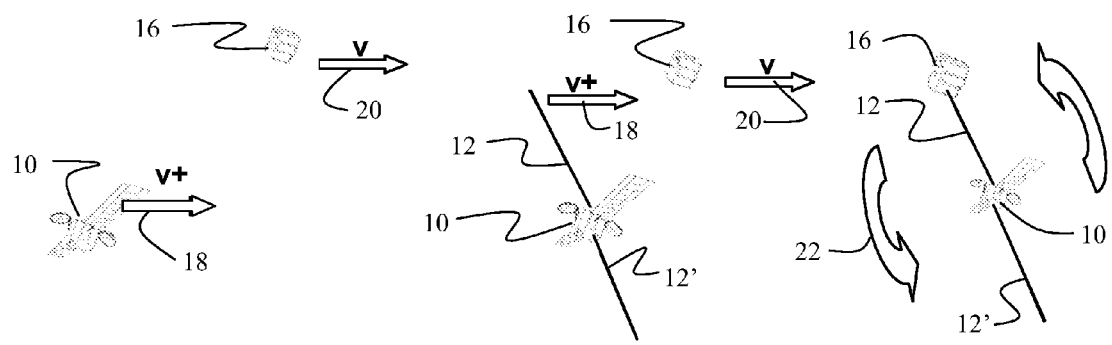
FIGS. 2A-2F are a sequence diagram for capture of space debris via a satellite employing the embodiment of FIG. 1.

FIGS. 2A-2F demonstrate operation of the embodiment disclosed in FIG. 1 to obtain an orbital plane change for satellite 10. In the initial configuration as designated shown in FIG. 2A satellite 10 is in an orbit represented by arrow 18 which is at lower altitude (below) orbit 20 of space debris 16. The satellite orbiting lower than the space debris has a higher relative velocity, V+, than that of the space debris at orbital velocity V. As shown in FIG. 2B symmetrical tethers 12 and 12' are extended above and below satellite 10. The length of tether 12 is adjusted to position capture mechanism 14 into the orbital path of space debris 16. In exemplary embodiments, positioning of the tether and its direction is managed by active damping means. As shown in FIG. 2C, capture mechanism 14 attaches to or captures the space debris 16. The difference in relative velocity of the capture mechanism, at the extent of the tether, and the space debris is small. Depending on the relative mass between the spacecraft 10 and space debris 16, rotational energy obtained by coupling of the satellite and space debris through the tether 12 may be used to rotate the captured debris into a lower orbit while imparting energy to the satellite for plane change as a rotational couple as represented by arrows 22. Additionally, the rotational energy transfer may be available to be employed to rotate the captured debris into a lower and potentially decaying orbit by waiting for the correct release point in the rotational maneuver.

The satellite uses the energy gained to transition to a new orbital plane where the process of debris capture can be repeated as necessary for further orbital plane changes. As an ancillary benefit, the removal of existing space debris, as opposed to the current paradigm of preventing future space debris is facilitated. In this regard, the current focus of space debris risk management on prevention rather than removal is forced by economics and physics. It is currently too expensive to utilize satellites to remove space debris because an impractically large amount of propellant on the satellite responsible for removing the space debris would be required.

Figures 2D, 2E, 2F:
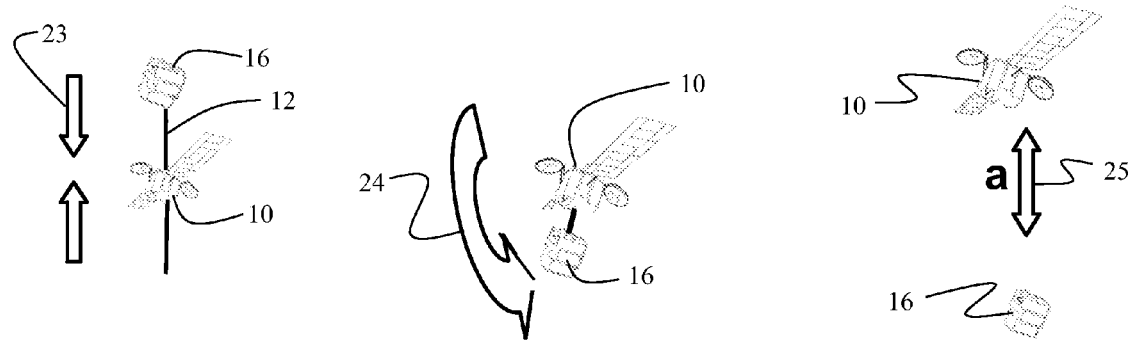

If it is not advantageous or possible to extract rotational momentum and release the debris in a manner amenable to creating a reaction for orbital plane change by the satellite 10, the tether 12 may be reeled into the satellite, as represented by arrows 23, carrying the debris 16 as shown in FIG. 2D. For example, the initial condition of the two satellites before capture may not allow the imparted rotational motion and release to enable a plane change to a location that allows continuation of the mission. It would be required to bring the debris to the satellite in order to be able to position the material for ejection in an orientation which would allow continuation of the mission. The space debris is then engaged by an electromechanical ram system, in FIG. 2E, as will be described with respect to FIG. 3. The satellite 10 with captured debris 16 is reoriented, as represented by arrow 24, and the electromechanical ram system is then employed to eject the debris 16 in a predetermined direction at a desired velocity as a reaction mass to create a corresponding reaction 25 moving the satellite into a new orbital plane as shown in FIG. 2F. As with the rotational momentum approach previously described, an added benefit is provided in that acceleration imparted to the space debris by the electromechanical ram may place the space debris into a rapidly decaying orbit.

Plane changes to lower orbit for the satellite 10 may be achieved by extending the symmetrical tethers 12 and 12', singly or in combination, to impart a drag on the satellite over a sufficient period of time to result in velocity decay and corresponding orbital altitude reduction.

Figure 3:
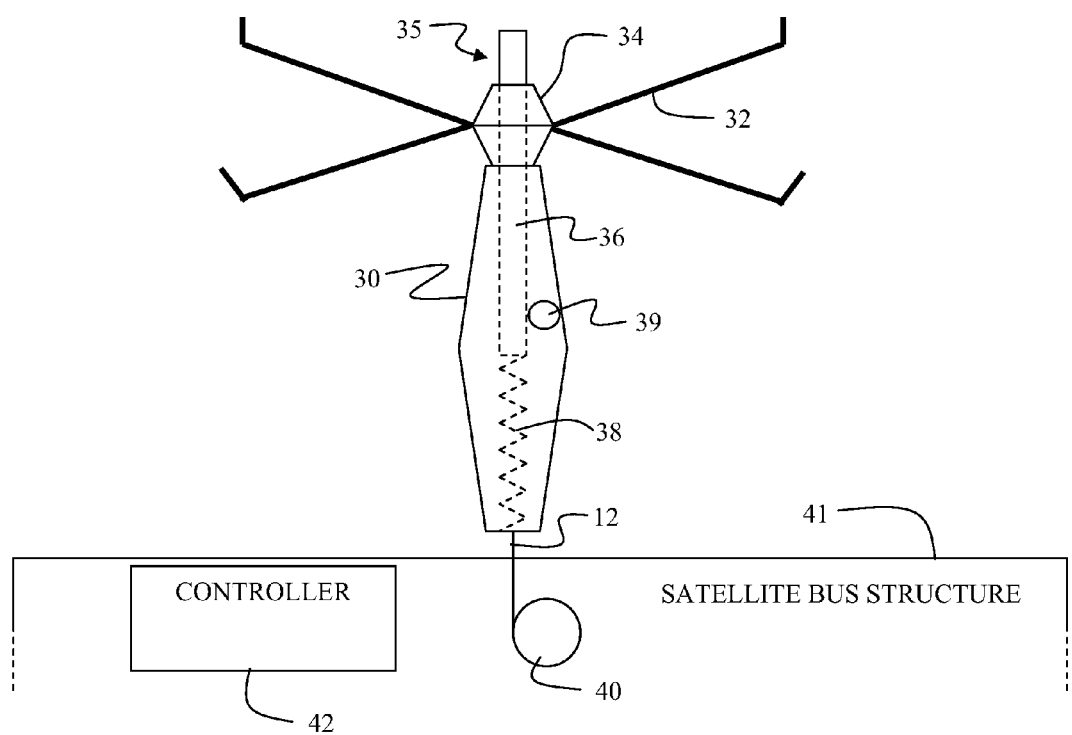
FIG. 3 is a detailed structural diagram for one embodiment employing a grappling arm and ejection system.

FIG. 3 shows an exemplary embodiment for the capture mechanism 14 employed on the tether 12. A grappling mechanism housing 30 is attached to tether 12. Multiple grappling arms 32 are supported for rotatable motion by a grappling arm support structure 34 which allows opening and closing of the grappling arms to engage or release a piece of space debris. An electromechanical ram 35 is created by a retractable ejection piston 36 centrally carried within the grappling mechanism housing and an associated spring 38. A mechanical or magnetic retraction mechanism (represented, as an example without limitation, by pinion 39) to compress the ejection piston and spring to a desired potential energy level may employ electromechanical motors powered as a portion of the satellite electrical system through solar panels or other renewable or extended energy source thereby avoiding any requirement to use expendable fuels. A tether reel 40 located on or within the structure of the satellite bus 41 is employed for extension and retraction of the tether for deployment of the grappling mechanism. A controller 42, which may be a separate computer system or an integrated element of the satellite control system, controls the tether and capture mechanism for interception of the debris, to allow extension and retraction of the tether on the reel as required for the chosen energy extraction method and for timed release of the debris. The computer additionally provides retraction and release control for the ram to impart desired momentum in ejecting the debris and orientation control of the satellite for intercepting the debris and positioning for momentum transfer.

Figure 4:
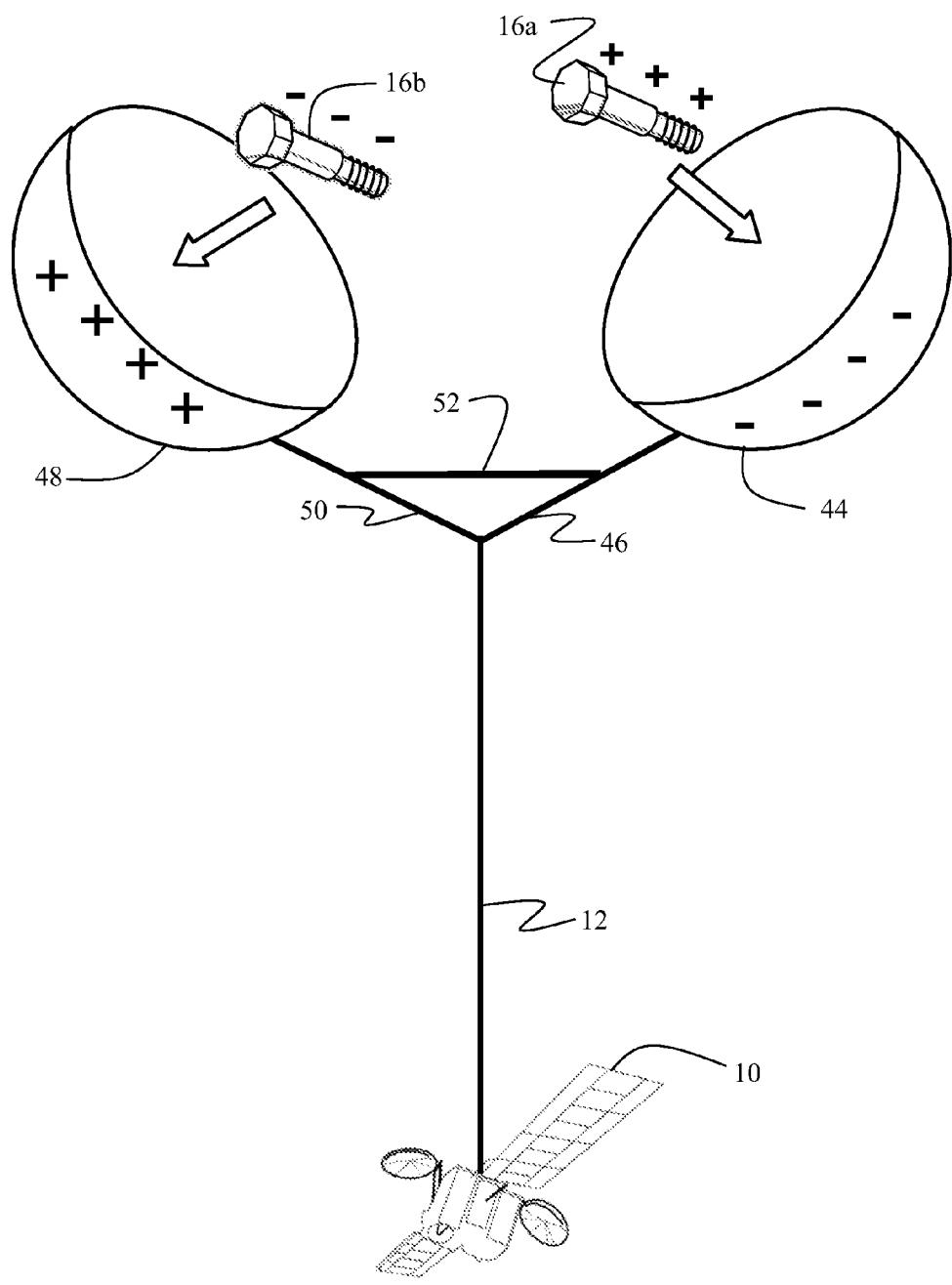
FIG. 4 is a pictorial diagram of a second embodiment of the debris capturing system; and, FIG. 5 is a flow chart depicting the method steps for obtaining orbital plane change with the embodiments described.

FIG. 4 shows an alternative capture mechanism which may be employed for space debris which may be smaller but still capable of providing significant orbital potential energy for use by the satellite. Smaller space debris tends to become ionized over time and therefore may be captured using electric potential. As shown in FIG. 4 positively charged debris elements 16a and negatively charged debris elements 16b may be present in a debris field. A first concave debris catching receptacle 44 employs a negative charge and is extended laterally from the tether by a first extender 46. A second concave debris catching receptacle 48 employs a positive charge and is extended laterally from the tether opposite the positive concave debris catching receptacle by a second extender 50. To obtain relative placement of the positive and negative receptacles a spacer 52 may be employed. Negatively charged debris 16b will be attracted to and captured by positively charged second concave debris catching receptacle 48 while positively charged debris 16a will be attracted to and captured by negatively charged concave debris catching receptacle 44. If sufficient mass is recovered in the debris field to provide momentum for employing rotational energy to impart a plane change to the satellite a process comparable to that disclosed in FIGS. 2B and 2C may be employed. Alternatively after capture of the ionized debris, tether 12 may be retracted into the satellite and the captured mass from the debris field employed for ejection using the electromechanical ram as defined in FIGS. 2E and 2F.

Figure 5:
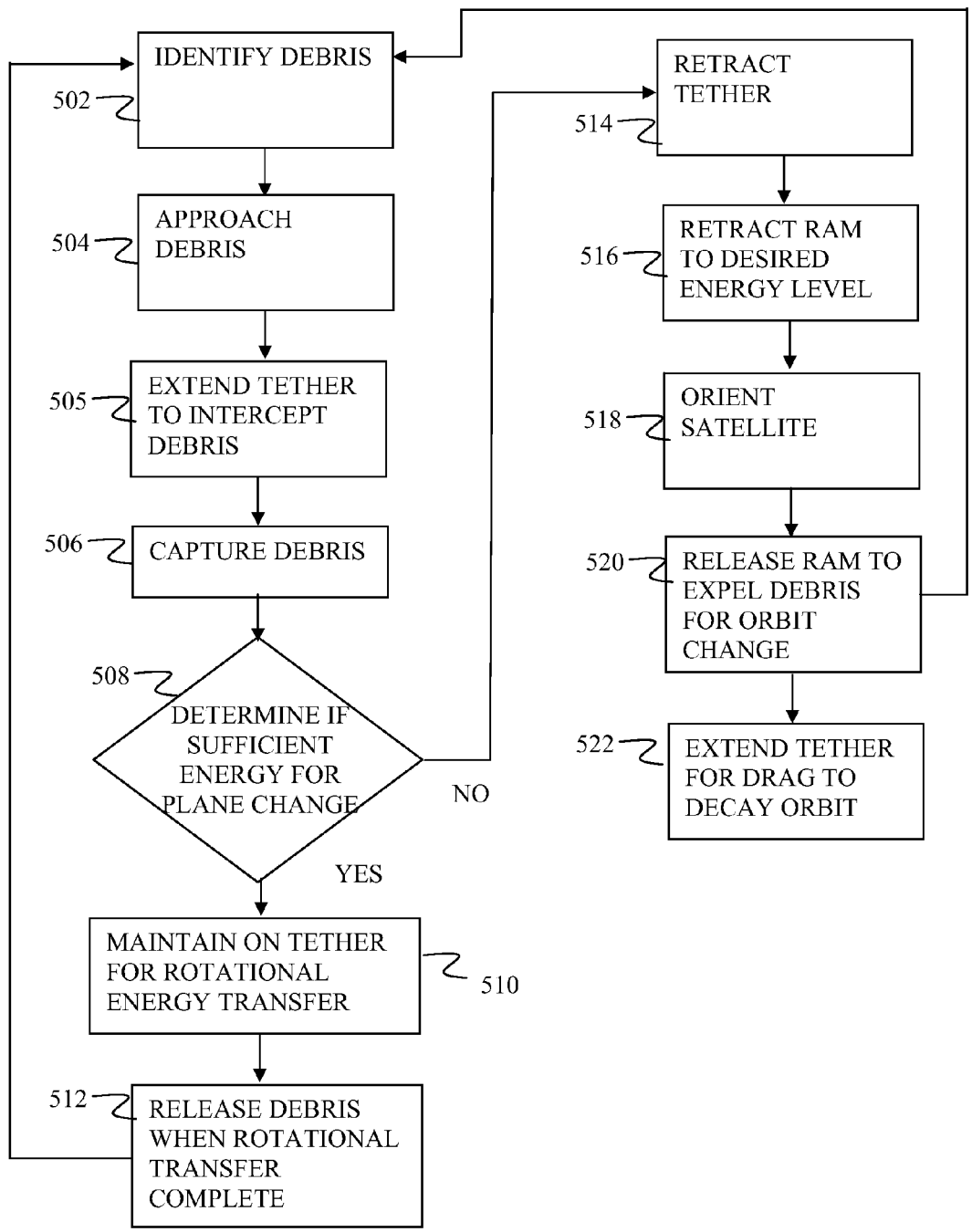

In operation the embodiments disclosed herein provide a method for a satellite to capture space debris and then utilize the resulting reaction mass with available orbital velocity differential or through imparted momentum to enable the satellite to make an orbital plane change and, possibly, send the space debris back to earth (and out of earth orbit). As shown in FIG. 5, the satellite would identify orbital debris within range or approaching range of the tether, step 502 and approach the orbital debris, step 504. The satellite would then extend the tether with the capture mechanism to intercept the orbital debris, step 505, and capture it, step 506. If a determination is made that calculated mass and differential momentum provide sufficient available energy for a desired plane change, step 508, the debris is maintained on the extended tether for rotational energy transfer, step 510, and released when the energy transfer is complete 512. Alternatively, the tether is retracted drawing the debris to the satellite, step 514, and the mechanical ram is retracted to impart a calculated energy level, step 516, the satellite is oriented for the desired orbital plane change, step 518, and ram is then released to eject the debris and introduce a resulting orbital velocity change in the satellite for the orbital plane change and, possibly, ensure the space debris' reentry to earth, step 520. Although the satellite may have propellant on board for limited maneuvering capability, the available reaction mass of orbiting space debris would be used by the satellite whenever possible to make orbital plane changes and conserve propellant, thereby extending the effective operational lifetime of the satellite. The satellite could extend the on-board tethers to impart drag, step 522, thereby allowing the satellite's orbit to decay to a lower orbital plane without the need for grabbing orbital debris

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. An apparatus for orbital change of a satellite comprising:
   at least one electrically charged receptacle for capturing ionized space debris;
   a tether connecting the capture mechanism to a satellite, said tether extendable to position the capture mechanism relative to the space debris; and
   a controller for timed release of the space debris; and,
   the at least one electrically charged receptacle having a positively charged concave debris catching receptacle and a negatively charged concave debris catching receptacle, the receptacles attached to the tether in spaced relation.

2. A satellite comprising:
   a bus;
   a reel mounted on the bus;
   a first tether rotationally extendible from said reel;
   a grappling mechanism housing attached to the first tether;
   multiple grappling arms supported for rotatable motion by a grappling arm support structure attached to the grappling mechanism housing, opening and closing of the grappling arms controllable to engage or release a piece of space debris;
   an electromechanical ram having a retractable ejection piston centrally carried within the grappling mechanism housing and an associated spring compressible to a predetermined length by a retraction mechanism for a desired potential energy level in the ejection piston;
   a second tether for extension symmetrical to said first tether; and,
   a controller, said controller operable for control of the tether and grappling mechanism to intercept, capture and release space debris, further operable for determination of a desired potential energy and engagement of the retraction mechanism, and for orientation of said bus.

3. A satellite comprising:
   a bus;
   a reel mounted on the bus;
   a first tether rotationally extendible from said reel;
   a positively charged concave debris catching receptacle attached to the tether with a first extender;
   a negatively charged concave debris catching receptacle attached to the tether with a second extender;
   a spacer interconnecting the first and second extenders for maintaining the positively charged concave debris catching receptacle and the negatively charged debris catching receptacle in spaced relation relative to the tether;
   a controller, said controller operable for control of the tether and debris catching receptacles to intercept, capture and release space debris, and further operable for determination of a desired rotation and timed release of said space debris.

4. A method for orbital change of a satellite comprising:
   capturing space debris;
   imparting reaction momentum to the satellite from the space debris to effect an orbital change.

5. The method of claim 4 wherein
   capturing space debris includes extending a tether into the orbit of the space debris and
   imparting reaction momentum comprises
      retaining the space debris to impart rotational momentum to the satellite based on differential momentum between the debris and satellite, and
      releasing the debris.

6. The method of claim 5 wherein releasing the debris includes placing the debris in an orbit for reentry.

7. The method of claim 4 wherein
   capturing space debris includes
      extending a tether into the orbit of the space debris; and
      retracting the tether upon capture of the debris; and,
   imparting reaction momentum comprises
      retracting a ram to eject the debris;
      orientating the satellite; and
      ejecting the debris to impart an orbital velocity change.

8. The method of claim 7 wherein ejecting the debris causes reentry of the debris.

* * * * *